(No Model.)
F. B. FARGO.
BUTTER WORKER.
No. 515,667. Patented Feb. 27, 1894.
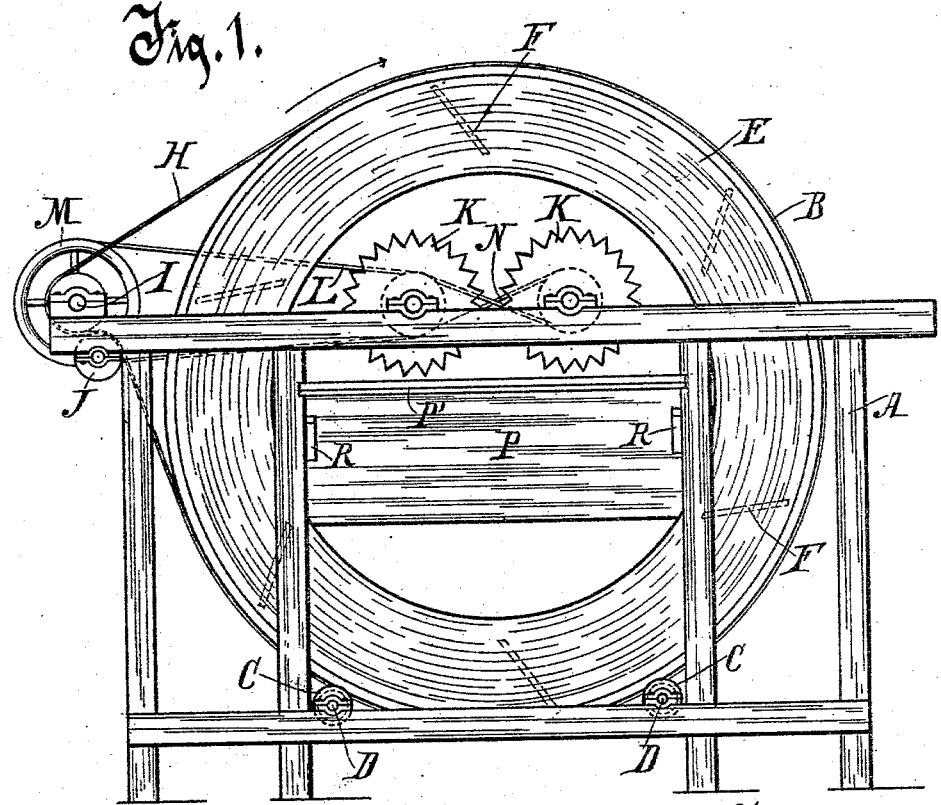
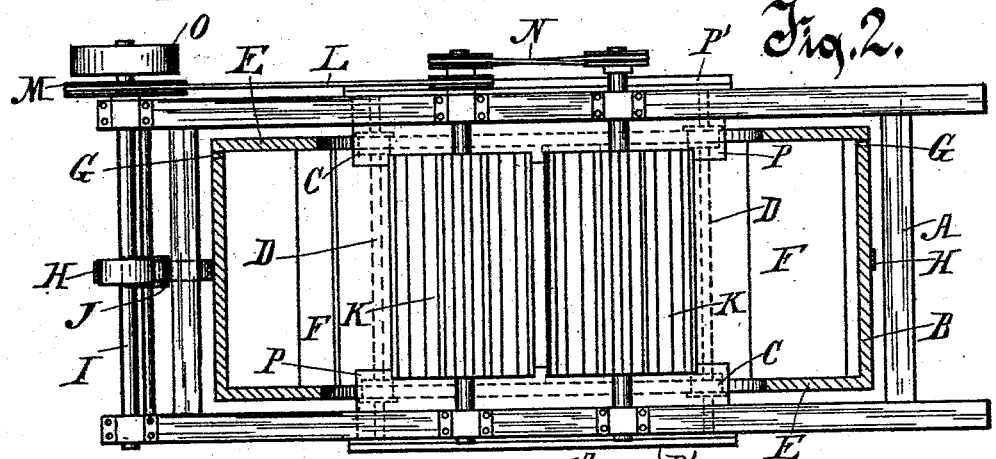
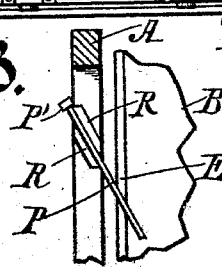
Witnesses.
Inventor.
Frank B. Fargo
By Benedict Morsell
Attorneys.

UNITED STATES PATENT OFFICE.

FRANK B. FARGO, OF LAKE MILLS, WISCONSIN.

BUTTER-WORKER.

SPECIFICATION forming part of Letters Patent No. 515,667, dated February 27, 1894.

Application filed January 3, 1893. Serial No. 457,025. (No model.)

*To all whom it may concern:*

Be it known that I, FRANK B. FARGO, of Lake Mills, in the county of Jefferson and State of Wisconsin, have invented a new and useful Improvement in Butter-Workers, of which the following is a description, reference being had to the accompanying drawings, which are a part of this specification.

The object of my invention is to provide a butter worker adapted to work and thereby to separate butter from the milk mingled with it as it comes from the churn, in large masses or in considerable quantity, which butter worker is to be operated by horse, steam or other suitable power and which combines simplicity of construction, minimum of cost, and convenient and easy use.

My invention is in the form and construction of the device and its parts, hereinafter described and claimed.

In the drawings, Figure 1, is an elevation of my improved device. Fig. 2, is a top plan view, a portion of the top of the drum being removed to show interior construction. Fig. 3, is a detail.

The frame A is of suitable form and construction to support the operative parts of the mechanism. The drum B is a short hollow cylinder the ends of which are only partially closed by the annular partial heads E extending inwardly from the periphery preferably less than half the distance to the axis of the drum leaving the central portion of the ends of the drum open. This drum B is supported revolubly on the sets of small wheels C C, on the rods or axles D D, mounted on the frame one at each side of and at a little distance from the vertical plane of the axis of the drum. Buckets F F are secured to the drum around its interior periphery at distances apart, which buckets are conveniently constructed of strips of board extending from end to end of the drum, the buckets being arranged obliquely to the radii of the drum inclining forwardly inwardly in the direction of the rotation of the drum. A little space is preferably left between the periphery of the drum and the adjoining edge of each bucket so that milk caught in the bucket when the bucket is at the lowest position it has in its revolution with the drum will escape from the bucket, running down the inside periphery thereof as the buckets are elevated by the revolution of the drum. Apertures G G are provided through the shell or periphery of the drum for the escape of milk therefrom. A belt H about the drum running also on a pulley on the driving shaft I rotates the drum as the shaft revolves. An idle pulley J mounted in suitable boxes therefor on the drum is preferably used to carry the belt H against a larger surface of the pulley on the shaft I. Two corrugated rollers K K substantially as long as the interior of the drum are arranged parallel to each other and to the axis of the drum within the drum and preferably above the axis of the drum, the two rollers being in the same horizontal plane. These rollers are located near to but do not engage each other, and are independently journaled at both ends in suitable boxes therefor fixed on the frame A. A belt L running on a pulley M fast on the driving shaft I transmits motion from the driving shaft to the nearest roller K and a crossed belt N running on pulleys on the journals of the rollers transmits reversed motion from the driven roller to the adjoining roller. These rollers revolve inwardly toward each other, as the drum is rotated in the direction of the arrow on Fig. 1. By this motion of the drum, butter is carried up on the buckets to the top of the drum from which it falls onto the rollers and by their inward revolution is carried downwardly between them being thereby pressed sufficiently to force the milk therefrom, the butter falling again onto the shell of the drum at the bottom to be again carried up and passed between the rollers as before. A shallow hopper can be placed in the drum above the rollers to guide the butter falling from the buckets onto the rollers if found desirable, but as such a hopper has been used heretofore in somewhat similar positions I do not deem it necessary to show or describe it.

Removable aprons P may be used in front of the central opening in each end of the drum to carry the butter falling from the rollers into the lower part of the drum and to prevent its escape from the drum as it falls. This apron may be conveniently inserted and removed by sliding it in the inclined ways R R fixed on the frame, the apron being prevented from going too far into the drum by means of the projecting top or bar P' fixed to the apron, which bar being a little longer than the apron engages the posts of the frame.

A pulley O fixed on the driving shaft I is adapted to carry a belt for transmitting power from any suitable source of supply.

It will be understood that this butter worker is especially well adapted for general use by persons not skilled in handling complicated machinery, by reason of its simplicity of construction and its convenience in use. The drum is mounted on wheels so that it revolves easily under the action of the belt running thereon, while by reason of the flanges on the wheels overlapping its ends, it is prevented from moving endwise away from its seat. The pressure rollers are mounted securely at both ends directly on the permanent frame, and therefore do not have the tilting strain that exists in those machines where the rollers are journaled at one end only, or are journaled in a swinging frame that is supported at one side of the drum only. The absence of gearing between the drum and the rollers is exceedingly desirable, in that it obviates expensive parts, liable to be broken or to get out of repair, and also, which is of great importance in a butter worker, in that it obviates the dirt and undesirable foreign material at and near the ends of the drum, which are sure to accumulate in and about a gearing, where cog wheels are used. Also as the drum is open centrally at both ends, and as there is a considerable space below the plane of the pressure rollers, butter and milk are readily put into the drum or removed therefrom at either end as convenience requires. There is nothing to interfere with this except only the aprons, which are supported on the frame, and can readily be removed. The convenience of this construction for the purpose of cleaning the interior of the drum is manifest. On removing the aprons the interior of the drum particularly below the pressure rollers is readily accessible for cleaning, and as the drum can be rotated so as to bring all its parts successively at the bottom, all parts may be easily cleaned.

What I claim as my invention, and desire to secure by Letters Patent, is—

1. In a butter worker, the combination with a frame, of a cylindrical drum without journals both ends of the drum being open centrally so as to permit of access to the interior of the drum at either end, wheels axled on the frame below and bearing against the perimeter of the drum and carrying the drum revolubly thereon, a plurality of pressure rollers in and nearly as long as, the interior of the drum, adjacent to each other in substantially the same horizontal plane and parallel with the axis of the drum, axial journals affixed to and supporting the rollers, bearings in which the roller-journals are mounted outside the drum on the main frame, buckets in the drum for elevating the butter, and means for driving the rollers and the drum independently, substantially as described.

2. In a butter worker, a revoluble cylindrical drum, revoluble rollers therein arranged parallel to each other for receiving and pressing butter as it is passed between them, buckets in the drum extending from end to end thereof near to the shell or periphery of said drum for elevating butter to the rollers, so arranged as to provide a space or aperture between the shell and the bucket for the escape of milk therethrough, and apertures in the shell of the drum also for the escape of milk, substantially as described.

3. In a butter worker, the combination with a revoluble peripherally-supported cylindrical drum open centrally at both ends having buckets fixed therein about its periphery for elevating butter by the revolution of the drum, of two rollers extending through the drum in the same horizontal plane and parallel with the axis of the drum, said rollers being journaled in the frame, belts for rotating the rollers independently of the drum, and removable aprons supported on the frame inserted in and partially closing the ends of the drums below the parallel rollers, substantially as described.

In testimony whereof I affix my signature in presence of two witnesses.

FRANK B. FARGO.

Witnesses:
C. F. GREENWOOD,
E. N. HARVEY.